United States Patent [19]
Wells

[11] 3,831,388
[45] Aug. 27, 1974

[54] METHOD FOR LAYING PIPE
[75] Inventor: Marvin E. Wells, Caldwell, Idaho
[73] Assignee: J. A. Terteling & Sons, Inc., Boise, Idaho
[22] Filed: June 4, 1971
[21] Appl. No.: 150,240

Related U.S. Application Data
[62] Division of Ser. No. 727,979, May 9, 1968, Pat. No. 3,605,419.

[52] U.S. Cl.................... 61/72.1, 61/41 A, 61/72.7
[51] Int. Cl............................. F16l 1/00, E02f 5/22
[58] Field of Search......... 61/72.1, 72.2, 72.5, 72.7, 61/41 A

[56] References Cited
UNITED STATES PATENTS

| | | | |
|---|---|---|---|
| 2,738,745 | 3/1956 | Harpold | 61/72.1 |
| 2,830,548 | 4/1958 | McElvany | 61/72.1 |
| 2,956,409 | 10/1960 | Wicke | 61/41 A |
| 3,354,661 | 11/1967 | Russell | 61/72.5 |
| 3,381,478 | 5/1968 | Wells | 61/72.5 |

FOREIGN PATENTS OR APPLICATIONS

| | | | |
|---|---|---|---|
| 546,549 | 7/1942 | Great Britain | 61/72.5 |

*Primary Examiner*—Jacob Shapiro

[57] ABSTRACT

An apparatus for installing a subterranean pipeline in an elongated earthen trench. The apparatus includes a mobile housing operable to be moved along and within the trench. Structure is provided for guiding individual sections of pipe into longitudinal alignment with the pipeline and mechanism is provided for shifting the sections into abutment with the pipeline and for maintaining the pipeline in compression to prevent the individual sections from moving substantially after they are emplaced. The structure and the mechanism are mounted for rectilinear vertical movement within the housing so that the grade of the pipeline may be closely controlled irrespective of the grade of the bottom of the trench. Also included is means for preventing development of suction between the housing and the trench when the latter is moist.

4 Claims, 10 Drawing Figures

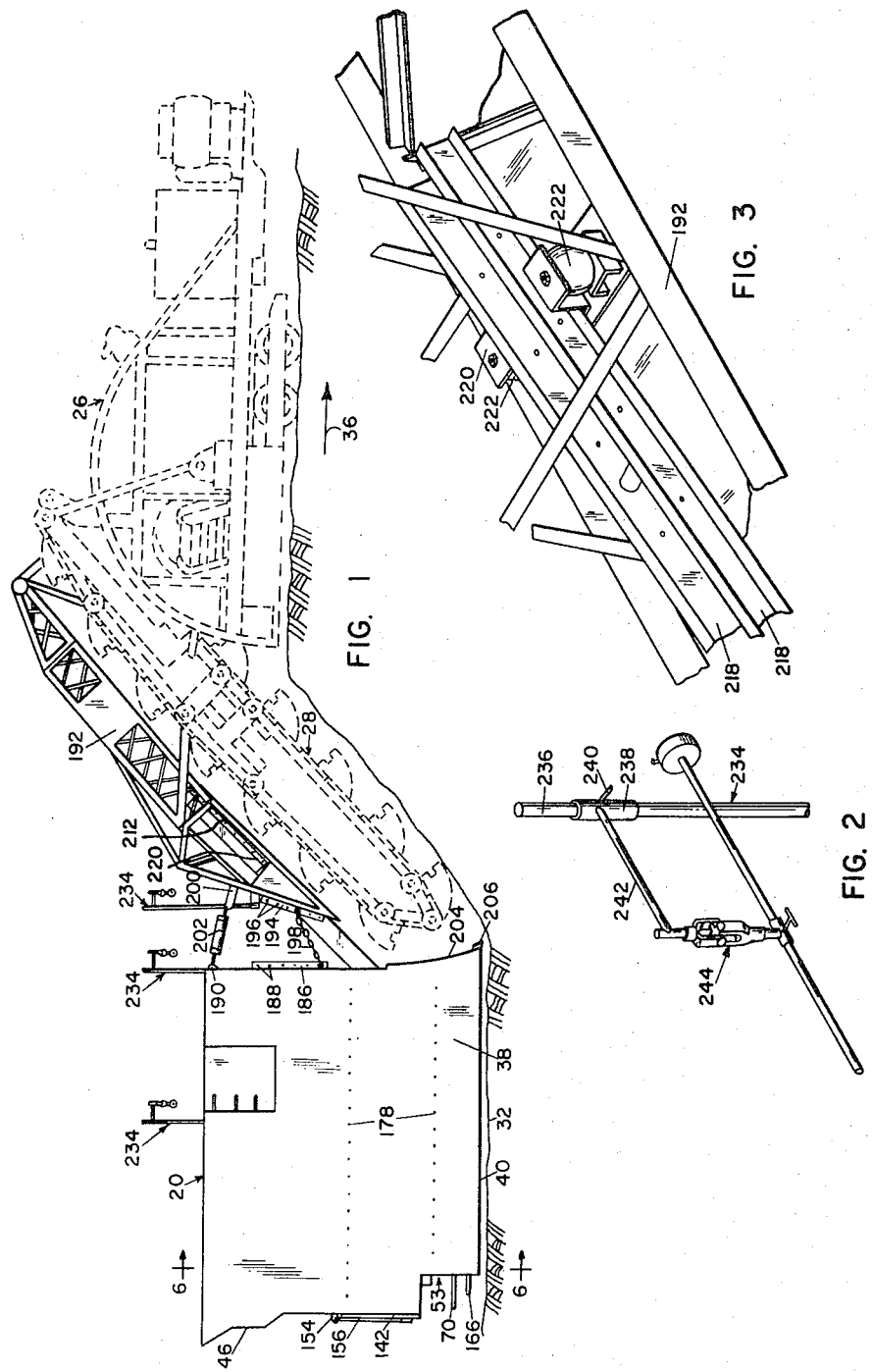

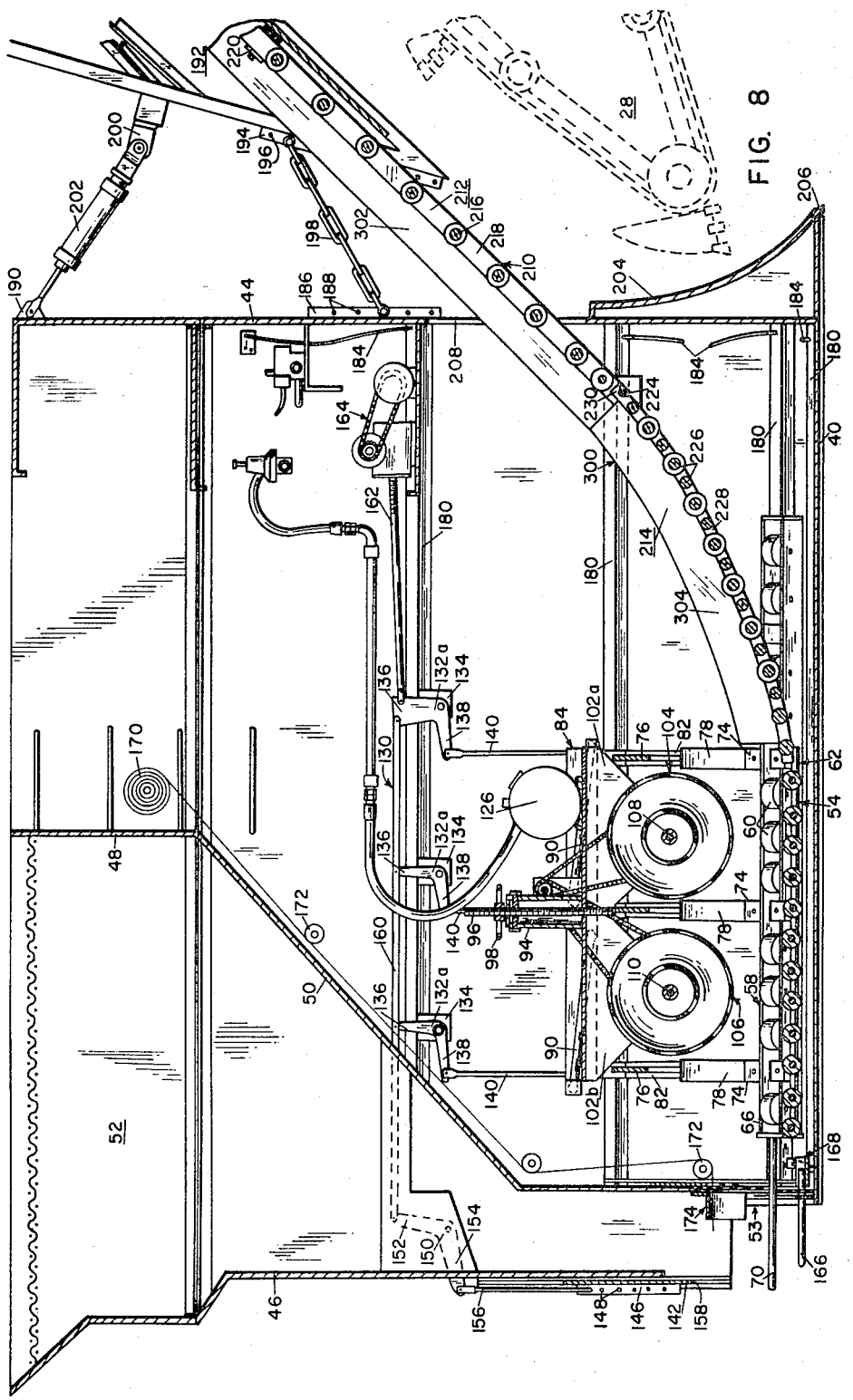

METHOD FOR LAYING PIPE

CROSS REFERENCE TO RELATED APPLICATION

This application is a division of my earlier application, Ser. No. 727,979 filed May 9, 1968, and now U.S. Pat. No. 3,605,419.

BACKGROUND OF THE INVENTION

1. Field of the Invention:

The present invention relates to a method and apparatus for laying pipe and more particularly, to a method and apparatus for installing a subterranean pipeline in an excavated trench.

2. Description of the Prior Art:

Subterranean conduits are often laid in a field of porous filter material within a substantially deep trench. The primary advantages of this mode of construction are to provide a stable environment for the conduit to reduce ordinary wear and tear, as well as to reduce maintenance on the conduit, and to provide means of drainage about the conduit. Such lines are commonly laid to depths up to fourteen feet below the original ground elevation. Commonly known trenching machines are generally used to excavate the trench not more than a few feet in width to such depths. The high vertical walls of such trenches are subject to subsidence, caving, or spalling and therefore should be supported. Traveling box-like housings, provided with an exitway in the rearwardmost portion thereof through which conduits may be laid have been employed behind trenching machines to provide such support. In laying conduits in subterranean drainage systems, mechanical apparatus operable to feed prefabricated interlocking unit sections of pipe through the exitways of such housings has been employed. Such apparatus has included components such as gravity and power driven conveyers and hydraulically or pneumatically driven rams. In such drainage systems, it is often desirable that interlocking unit sections of pipe are each so positioned and aligned, one with the other, that subterranean ground water may infiltrate between the interlocking pipe joints, and, at the same time, that each joint shall provide a barrier to prevent the intrusion of solid material into the pipe. Frequently asphaltic papers or the like may be laid over and about the upper portion of the pipe to divert such material and cause the more clear and settled ground water to percolate into the conduit system from beneath the pipe. Mechanical means to dispense such papers and means to backfill the trench with porous filter materials have been suggested in combination with machines known in the prior art.

Failure in subterranean conduits frequently is caused by separation or displacement of adjoining sections of conduits. Substantially all such displacemnt occurs during the construction operations and may be attributed to a failure to maintain the sections in compression during the backfilling operation, or a failure to stabilize the backfill material deposited about the conduit or to both.

It is frequently required that the grade level of drainage conduit be controlled to within a fraction of an inch. However, it is practically impossible to control the grade at the bottom of a trench within this degree of accuracy with conventional ditch diggers. Typically the mobile housings for laying conduit travel on the bottom of the trench and the maintaining of highly accurate grade levels for the pipe itself is extremely difficult with conventional equipment.

Furthermore, such housings are generally adapted for sliding on the bottom of the trench and when moist earth or clay is encountered, sufficient suction may be developed between the housing and the walls of the trench to hinder the movement of the housing.

SUMMARY OF THE INVENTION:

Accordingly, it is an extremely important object of the present invention to provide an apparatus and a method for laying pipe wherein the pipe is accurately positioned and maintained in such position until the installation of the pipeline has been completed. In this connection, it is an important aim of the invention to provide such an apparatus including mechanism for positively maintaining a section of pipe pressed tightly against the pipeline at least until the trench has been backfilled around the section. Furthermore, it is an aim of the invention to regulate the amount of force used in pressing the sections together so that the sections are neither laterally displaced or damaged by the force applied thereto.

An additional object of the invention is to provide structure in such an apparatus whereby the vertical position of the pipe relative to the apparatus may be adjusted so that the grade level of the pipeline is accurately maintained without reference to the grade level at the bottom of the trench.

A further object of the instant invention is to provide such an apparatus with means for breaking suction developed between the apparatus and moist earth in the trench so that the progress of the apparatus through the trench is substantially unimpeded.

Yet another very important object of the invention is the provision of pipe laying apparatus of the type described above wherein is included means for distributing backfill material around the pipe as the same is constructed. In this respect, it is an important aim to provide means for compacting the backfill material and regulating the depth of the same so that the pipeline is adequately anchored therewithin.

Broadly, and in one aspect, the apparatus of the instant invention comprises a mobile frame operable to move along a projected pipeline path as pipe sections are added to the pipeline. Structure operable to support a pipe section to be added to the pipeline is mounted on the frame in a position so that the pipe section supported thereby is aligned with the pipeline. A pipe section shifting mechanism is carried by the frame adjacent the structue and includes movable means engageable with a supported pipe section for shifting the pipe section on the structure, toward the pipeline and into abutment with the latter. The movable means is driven by a variable power means operable to decrease the force applied to a pipe section by the movable means when the movement of the section is resisted by the pipeline.

In another aspect, the apparatus of the invention includes a pair of wheels disposed above the structure and rotatable about parallel axes spaced longitudinally of a section supported on the structure. Such axes extend substantially perpendicularly of the supported section so that the wheels frictionally engage the outer periphery of the section and upon rotation of the wheels, the section is urged toward the pipeline.

When the apparatus is utilized for laying subterranean conduit in an elongated earthen trench, the frame takes the form of a housing having a bottom wall. The housing is operable to move within and along the trench with the bottom wall supported by the bottom surface of the trench. Means are provided on the wall for precluding the development of suction between the wall and the surface when latter is moist. Thus, the movement of the housing is substantially unimpeded.

In yet another aspect, the apparatus includes elevator means mounting the structure and the mechanism for vertical, rectilinear movement whereby the depth of the pipeline within a trench may be accurately controlled. Thus, the grade of the pipeline is controllable without reference to the grade of the bottom of the trench.

The apparatus may also include a dispenser carried by the frame (or housing) for depositing a layer of material on the bottom of the trench and around the pipe sections as the same are moved into abutment with the pipeline. Such dispenser is preferably provided with means for selectively varying the depth of material deposited within the trench. Thus, when the vertical position of the structure and mechanism is altered via the elevator means, the amount of material deposited above the pipeline can be maintained constant by actuating the means for selectively varying the depth of material. This is to say, no matter what the depth of the trench, the pipeline may be maintained at a depth of say ten feet and have at least say two feet of material thereabove. This is particularly important when the pipeline is used for drainage purposes and the material comprises a filter material such as gravel.

Another important feature of the apparatus which embodies the invention is the provision of material consolidating means disposed beneath the dispenser and within the material deposited in the trench thereby. Thus, the material may be compacted to provide a firm support for the pipeline.

Manifestly the apparatus of the invention is suitable for installing an elongated, continuous, substantially flexible conduit within the trench. The grade level of such a conduit may also be very closely controlled through the use of the elevator means in the same manner as described above.

The invention also includes a method of constructing a pipeline through the use of the apparatus of the invention. This method includes the steps of establishing an initial length of pipeline, emplacing a pipe section in longitudinal alignment with said initial length, shifting the section toward and into abutment with the length by applying a longitudinally acting force thereto, and thereafter, decreasing the intensity of the force to preclude lateral shifting of or damage to the sections.

BRIEF DESCRIPTION OF THE DRAWINGS:

FIG. 1 is a side elevational view of an apparatus embodying the concepts and principles of the instant invention and showing, in dashed lines, a conventional ditch digging machine which provides the motive power for the apparatus;

FIG. 2 is an enlarged isometric, detailed view of a sight guage used in conjunction with the apparatus;

FIG. 3 is an enlarged isometric view of the upper end of the feed conveyer of the apparatus;

FIG. 8 is an enlarged cross-sectional view taken substantially along line 8—8 of FIG. 5;

Figure 10:
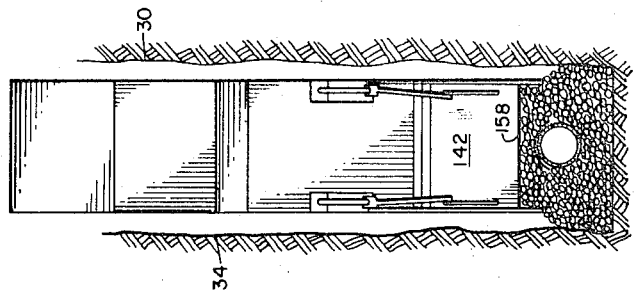
FIG. 10 is a rear elevational view of the showing of FIG. 9.

DESCRIPTION OF THE PREFERRED EMBODIMENT:

An apparatus embodying the concepts and principles of the instant invention is broadly designated by the numeral 20. Apparatus 20 is particularly adapted for constructing a pipeline 22 consisting of a plurality of elongated pipe sections 24 disposed in end-to-end relationship within an earthen trench 30 as best seen in FIG. 10. Furthermore, apparatus 20 is adapted for installing a continuous substantially flexible conduit or the like within trench 30. In practice, apparatus 20 derives a substantial portion of its inherent utility from the fact that it is capable of handling either continuous conduit or short sections of drainage tile or the like. However, the functions of the components of apparatus 20 are more vividly illustrated when described in connection with the construction of a pipeline consisting of sections such as the sections 24. Thus, this use of apparatus 20 has been elected in this description to better illustrate the more advantageous features of the present invention and its inherent ability to alleviate the substantial problems encountered in aligning and abutting comparatively shorter sections of pipe.

Apparatus 20 is shown for illustration only in the environment of a commonly known trench excavator 26 which is not intended to form a part of the instant invention. In this respect, apparatus 20 is adapted to be utilized in conjunction with any of a variety of types of excavators, including a back hoe. Although a detailed description of excavator 26 appears unnecessary, it should be pointed out that excavator 26 includes an elongated, conveyorized, digging bucket mechanism 28 adapted for digging an elongated, earthen trench 30 having a substantially horizontal bottom surface 32 and substantially vertical side surfaces 34. Thus, when the apparatus 20 is used in conjunction with an excavator of the type shown at 26, the pipeline constructed thereby is disposed within trench 30 and is subterranean. As can be seen viewing FIG. 1, excavator 26 and apparatus 20 are adapted for movement in the direction of arrow 36 along a projected pipeline path.

While apparatus 20 is particularly adapted for constructing subterranean pipelines, it will be readily appreciated by those skilled in the art that the same would have utility for constructing ground level pipelines.

Apparatus 20 includes a mobile frame in the nature of a housing 38. Housing 38 is substantially rectangular and boxlike, and has a bottom wall 40, a pair of side walls 42 which extend generally upwardly from opposite sides of wall 40, forwardmost wall 44 which extends laterally between walls 42 and upwardly from wall 40, rearwardmost wall 46 which extends laterally between the rearwardmost extremities of walls 42. An internal wall 48 having an inclined portion 50 is disposed forwardly of wall 46 and extends laterally between walls 42 to present a dispenser in the nature of a hopper 52 which will be discussed in greater detail hereinbelow. Walls 46 and 48 terminate above bottom wall 40 presenting an exitway 53 disposed generally beneath hopper 52.

As mentioned above, the motive power for apparatus 20 may be provided by a trenching machine as excavator 26. For this purpose, wall 44 is provided with a pair of horizontally spaced, vertical bars 186, which project forwardly from opposite sides of wall 44. Each of the bars 186 has a plurality of vertically spaced holes 188 therethrough. A housing leveling mounting bracket 190 is suitably fixed to wall 44 and is centrally disposed at the upper end thereof.

An open lattice-like frame 192 is attached to excavator 26 above the mechanism 28 thereof. A pair of horizontally spaced, rearwardly projecting bars 194 are provided on the lowermost end of frame 192 in a position to generally coincide with the bars 186 on wall 44 when mechanism 28 is in its excavating position as illustrated in FIG. 1. Bars 194 are each provided with a plurality of spaced holes 196, and cables or chains 198 are fastened between the holes 188 in bars 186 and the holes 196 in bars 194 to provide means by which apparatus 20 is towed. A housing leveling mounting bracket 200 is disposed on frame 192 and a piston and cylinder assembly 202 is pivotally connected between brackets 190 and 200. In practice, it has been found that the forwardmost end of housing 20 will tend to be forced downwardly into the bottom surface 32 of trench 30 as housing 20 is towed therealong. To counteract this tendency, assembly 202 is provided with air of hydraulic fluid under pressure from a suitable source (not illustrated) to cause assembly 202 to be extended and exert a stabilizing upward force on the forwardmost end of housing 38.

A concave bulldozer-like blade 204 which is shaped to conform to the arc of travel of the buckets of mechanism 28 is provided at the lower end of wall 44 to push loose earth forwardly and into the path of the buckets of mechanism 28. An earth engaging moldboard bit 206 laterally along the lower terminal edge of the blade 204 to smoothly cut and to trim the irregular bottom 32 of trench 30 as it is left by the buckets of mechanism 28. Thus, the trench bottom 30 is smoothed to prevent undulating movement of apparatus 20. An entranceway 208 is provided in wall 44 above blade 204 and in substantial alignment with the rearwardmost end of frame 192. A downwardly inclined conveyor 210 extends through entranceway 208 and comprises a flat, straight upper section 212 and a generally arcuate lower section 214. Section 212 comprises a plurality of rollers 216 mounted for rotation between a pair of spaced channel members 218, each of the members 218 having one end slidably disposed in a cradle-like portion 220 shown to advantage in FIG. 3. Portion 220 is resiliently mounted on the frame 192 through a pair of vibration isolators 222 which absorb the impact transmitted to the frame 192 when the buckets of mechanism 28 are digging. The members 218 extend from portion 220 through the entranceway 208 and each of the members 218 are provided with hook portions (not shown) suitably fastened at their respective lower terminal ends. The hook portions of members 218 are carried by a shaft 224 which extends laterally between side walls 42 of the housing 38. In this manner section 212 may pivot on shaft 224 and slidably move in cradle-like portion 220 in response to upward and downward movement of mechanism 28 and frame 192 carried thereby. It may be noted in FIG. 1 that section 212 is inclined downwardly from cradle-like portion 220 and into housing 38 at the least possible angle of inclination consistent with the depth of trench to be excavated.

Lower section 214 is best illustrated in FIG. 8. Section 214 includes a plurality of alternately inwardly facing rollers 226 mounted for rotation between a pair of spaced and slightly arcuate shaped bars 228. Section 214 is pivotally connected to shaft 224 between members 218 of upper conveyor section 212 by a pair of hooks 230 suitably fastened to the upper ends of bars 228. The opposite ends of bars 228 are slidably carried in a cradle-like portion 232 as shown in the forwardmost yoke 74 of a pipe supporting structure 54 herein later described. Since sections 212 and 214 may slidably move their respective cradle portions 220 and 232, each of the sections 212 and 214 may articulate about shaft 224 in response to vertical movement of either frame 192 or yoke 74 while remaining oriented one with the other. It has been found to advantage to keep the radius of the bars 228 as nominal or sweeping as possible since the interlocking joints of the pipe are more readily broken or damaged as the degree of transition between inclined sections 212 and 214 and horizontal pipe laying portions of an apparatus 20 is increased. The combination of the elements of a low entranceway 208, a relatively nominally inclined section 212, and the sweeping transitional arc of section 214 provide structure and means by which substantially continuous sections of pipe of indefinite length may be slightly flexed to be laid through the housing 38.

A sidewall 300 is provided on each side of conveyor 210. Each sidewall includes an upper portion 302 for section 212 of conveyor 210 and a lower portion 304 are all similarly mounted on their corresponding sections 212 and 214 for horizontal adjustment toward and away from the corresponding section. In this connection, each portion 302 and 304 is provided with a plurality of horizontal extending sleeves 306 each slidably receiving a corresponding horizontally extending stud 308 therein. The studs 308 extend outwardly from the corresponding members 218 and bars 228. A set screw (not shown) is provided for each sleeve 306 to kind the same to its corresponding stud 308. Thus the distance between sidewalls 300 may be slidably adjusted to accommodate pipes and conduits of various diameters.

A pipe section supporting structure 54 is disposed within housing 38 and generally beneath the inclined portion 50 of wall 48. Structure 54 is operable to support a pipe section 24 and guide the latter into longitudinal alignment with pipeline 22 while the section 24 is being brought into abutment with the forwardmost extremity of pipeline 22. In this respect, it is to be appreciated that as the sections 24 become abutted with the pipeline 22, they become a part of the pipeline 22. Structure 54 includes an elongated conveyor chute 56 which is disposed in longitudinal alignment with pipeline 22. Chute 56 is provided with a pair of horizontally spaced, inwardly facing, inclined banks 58 of rollers 60 and an upwardly facing bank 62 of rollers 64 disposed between banks 58. Each bank 58 comprises a pair of elongated, spaced straps 66 and the rollers 60 are mounted for rotation between corresponding pairs of straps 66 as can best be seen in FIGS. 6 and 8. An end plate 68 is provided at the rearwardmost extremity of each bank 58 and extends laterally between the straps 66 of each bank 58 respectively as can best be seen viewing FIG. 7. A guide rod 70 is attached to each plate 68 and extends generally rearwardly therefrom, through exitway 53 and in longitudinal alignment with chute 56.

Bank 62 includes a pair of spaced strap 72 between which the rollers 64 are mounted for rotation. Thus, a pipe section 24 is cradled on rollers 60 and 64 in longitudinal alignment with pipeline 22. A flexible barrier member 71, having a plurality of radial segments 71a, is disposed in exitway 53 over guide rods 70.

Figure 4:
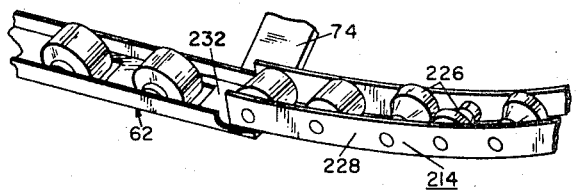
FIG. 4 is an enlarged isometric view of the lower end of the feed conveyer of the apparatus.
Figure 5:
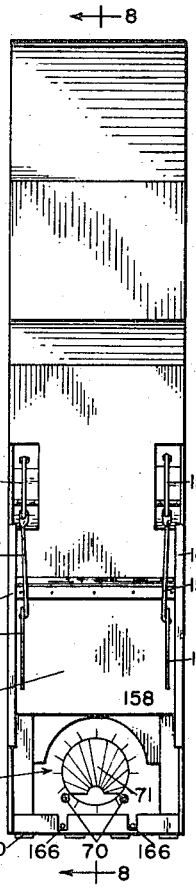
FIG. 5 is an enlarged rear elevational view of the apparatus.
Figure 6:
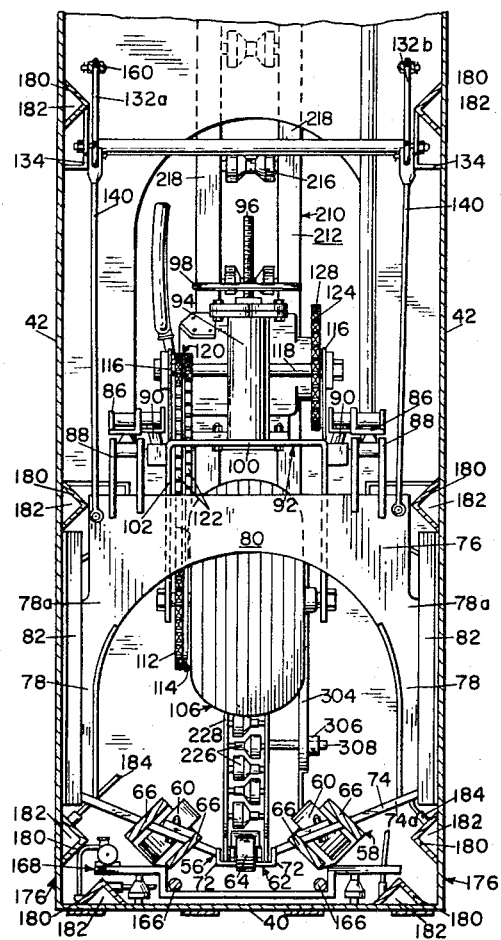
FIG. 6 is an enlarged, cross-sectional view taken substantially along line 6—6 of FIG. 1.
Figure 7:
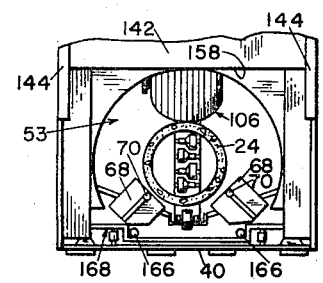
FIG. 7 is an enlarged, elevational, rear, fragmentary view of the apparatus with certain positions broken away to reveal constructional details.

A plurality of elongated yokes 74 extend laterally of housing 38 between walls 42 and the straps 66 and 72 are attached, as by welding or the like, thereto. An arch-shaped member 76 is provided for each yoke 74 repectively. Each member 76 has a pair of spaced leg portions 78 which are interconnected by a bight portion 80. The lowermost extremity of the legs 78 are attached to opposite ends 74a of a corresponding yoke 74 as is best illustrated in FIG. 6. Each leg 78 has a wing portion 78a slidably received within a vertical guide 82 mounted on a corresponding wall 42. Thus, the members 76 and thereby the chute 56 are vertically shiftable relative to the housing 38.

A mechanism 84 is mounted atop members 76 and is operable for shifting sections 24 along structure 54 and into abutment with the forwardmost end of pipeline 22. Mechanism 84 includes a pair of spaced beams 86 which are connected to members 76 by appropriate brackets 88. A pair of spaced, parallel, elongated rods 90 are swingably mounted on each beam 86 for rotation about substantially horizontal axes which extend transversely of housing 38. The opposite ends of the rods 90 are pivotally connected to a table 92 in a manner such that each beam 86, the rods 90 swingable thereon and the table 92 form a parallelogram and thus the table 92 is movable vertically relatively to beams 86. An internally threaded housing 94 is mounted on table 92, centrally thereof. An elongated jack screw 96 is threadably received within housing 94 and extends downwardly through an appropriate aperture in table 92 and into contact with the upper edge of the central arch-shaped member 76 as best illustrated in FIG. 8. Thus, when screw 96 is rotated by a hand wheel 98 affixed thereto, the vertical position of table 92 relative to beams 86 may be adjusted. Hence, the vertical distance from table 92 to chute 56 may also be adjusted.

Table 92 includes a substantially horizontal bight portion 100 and a pair of horizontally spaced, downwardly extending side portions 102 which are interconnected by bight portion 100. Each side portion 102 comprises a pair of side-by-side, substantially V-shaped segments 102a and 102b. Thus, the segments 102a of the portions 102 are directly opposed in laterally spaced relationship and similarly the segments 102b are directly opposed in laterally spaced relationship. The segments 102a rotatably mount a wheel 104 therebetween while the segments 102b similarly mount a wheel 106 therebetween. The wheels 104 and 106 are rotatable about respective parallel axes 108 and 110 which are spaced longitudinally of chute 56 (or a pipe section 24 thereon) and extend substantially perpendicularly thereof. Each wheel 104 and 106 include a resilient, pneumatic tire 112 which is disposed for frictionally and tangentially engaging the outer periphery of a pipe section 24 on chute 56. Thus, wheel 104 and 106 present movable means engagable with a pipe section 24 on structure 54 and it can be seen that upon rotation of wheels 104 and 106 in a clockwise direction (FIG. 8), a pipe section 24 engaged thereby will be shifted toward the pipeline 22. Furthermore, it can be seen that because the wheels 104 and 106 are carried by table 92, the wheels are movable toward and away from chute 56 when jack screw 96 is rotated.

Each wheel 104 and 106 is provided with a drive sprocket 112 which is connected to its corresponding wheel 104 and 106 by a slip clutch 114. Thus, if the rotation of either of the wheels 104 or 106 is resisted, the corresponding sprocket 112 may continue to rotate by virture of the slip clutch while the wheel (104 or 106) remains stationary. A pair of laterally spaced brackets 116 extend upwardly from opposite sides of the bight portion 100 of table 92 and rotatably mount an idler shaft 118 for rotation about a substantially horizontal axis extending transversely of housing 38. A pair of sprockets 120 are attached to shaft 118 for rotation therewith in substantial alignment with the sprockets 112 and a chain 122 is provided for operably interconnecting each sprocket 112 with a corresponding sprocket 120. Thus, upon rotation of shaft 118, sprockets 112 and thereby wheels 104 and 106 are rotated.

A sprocket 124 is mounted for rotation with shaft 118 at the opposite end thereof from sprockets 120. Sprocket 124 is aligned with the drive sprocket 125 of variable power means such as a hydraulically actuated variable torque motor 126 which serves as a prime mover means for wheels 104 and 106. A chain 128 operably interconnects sprocket 124 and sprocket 125 so that upon rotation of motor 126, wheels 104 and 106 are rotated. It is to be appreciated that the slip clutches 114, sprockets 112, chains 122, sprockets 120, shaft 118, sprocket 116, chain 128 and the drive sprocket of motor 126 present a common power train for rotating wheels 104 and 106 simultaneously whenever motor 126 is actuated. Furthermore, motor 126 is provided with variable torque means for governing the power output thereof. Hence, either the variable power means of the motor 126 or the slip clutches 114 of the wheels 104 and 106 provide means for decreasing the amount of force applied to a pipe section 24 after the same is brought into abutment with the pipeline 22. This is to say the wheels 104 and 106 will provide motive power for a pipe section 24 so long as the movement of the pipe section 24 is not substantially resisted.

An elevator 130 is provided for supporting structure 54 and thereby mechanism 84 and for moving the same rectilinearly and vertically. Elevator 130 includes a pair of bell cranks 132 for each arch-shaped member 76. The cranks 132a and 132b of each pair 132 thereof are rotatably mounted on respective brackets 134 disposed on opposite side walls 42 of the housing 38 as can best be seen viewing FIG. 6. Each crank 132a and 132b includes a vertical leg 136 and a horizontal leg 138.

A lifter rod 140 pivotally connected to each horizontal leg 138 and depends therefrom. Each rod 140 is also connected to the upper edge portion of a corresponding member 76. Thus, it can be seen, that upon rotation of cranks 132 about the horizontal axes of their pivot points 141, structure 54 and mechanism 34 will be correspondingly raised or lowered.

Hopper 52 presents a dispenser for depositing a layer of material on the bottom of trench 30 and around and above the sections 24 as the latter become a part of the pipeline 22. Hopper 52 is provided with means for selectively varying the depth of material deposited in the nature of a vertically shiftable, upright gate 142. Gate 142 is disposed at the lower extremity of wall 46 and is co-extensive in width therewith. A pair of elongated vertical guides 144 slidably receive the opposite sides of gate 142 therein and permit the gate 142 to move vertically. Gate 142 is provided with a pair of horizontally spaced, vertically extending straps 146, each of which is provided with a vertical row of holes 148 as can best be seen viewing FIG. 8. A bell crank 150 is provided for each strap 146, the cranks 150 being similar to the cranks 132 and disposed in horizontal alignment therewith. That is to say, there is a crank 150 horizontally aligned with the cranks 132a and another crank 150 horizontally aligned with the cranks 132b. Each crank 150 has a vertical leg 152 and a horizontal leg 154. A lifter rod 156 is pivotally connected to each leg 154 and depends therefrom. The lifter rods each have a hook-shaped lower end 157 which is inserted into an appropriate hole 148. Thus, it can be seen that the vertical position of gate 142 can be altered by placing end 157 in different holes in strap 146. Manifestly, the lower edge 158 of gate 142 establishes the upper level of material flowing from hopper 52 and into the trench 30.

The vertical legs 136 of cranks 132a and the vertical leg 152 of the crank 150 aligned therewith are pivotally connected to an actuator rod 160. Similarly, the vertical legs 136 of cranks 132b and the vertical leg 152 of the crank 150 aligned therewith are pivotally connected to an identical actuator rod 161. A jack rod 162 is pivotally connected to the vertical leg 136 of the forwardmost of the bell cranks 132a and extends forwardly therefrom into operable engagement with the threaded drive mechanism 163 of a motorized jack 164. In this respect, it is to be recognized that the threaded drive mechanism 163 of the motorized jack 164 receives a threaded end portion 162a of rod 162 therein and upon rotation of the threaded drive mechanism 163, rod 162 will be moved toward or away from jack 164 depending upon the direction of rotation of the drive mechanism. A similar jack rod (not shown) is pivotally connected to the vertical leg 136 of the forwardmost of the cranks 132b. Jack 164 has a second drive mechanism (not shown) which is operably connected to this jack rod. Thus, as the jack rods 162 are drawn toward jack 164 by the mechanisms 163, the elevator 130 will be actuated to raise structure 54 and mechanism 84, whereas, if the jack rods 162 are moved outwardly away from jack 164, elevator 130 will lower structure 54 and mechanism 84. It is to be noted that cranks 150 will also be actuated to raise or lower gate 142 whenever structure 54 and mechanism 84 are correspondingly raised or lowered. Thus, the lower edge 158 of gate 142 is maintained at a constant height relative to chute 56.

Material consilidating means in the nature of a pair of vibrator rods 166 is disposed beneath hopper 52 and within the material deposited thereby. Rods 166 are actuated by a vibrator mechanism 168 so that the material around pipeline 22 is densified or compacted. In this respect, it is to be recognized that the material distributed from hopper 52 will most generally comprise gravel or sand to provide a filter medium which cooperates with the drainage tile of pipeline 22 to permit seepage of ground moisture into the tile while excluding dirt and silt and the like.

Apparatus 20 is provided with means 176 for precluding development of suction between walls 42 and 40 of housing 38 and surfaces 32 and 34 of trench 30. Means 176 comprises a plurality of spaced holes 178 which are provided in side walls 42 of housing 38. Manifold means in the nature of angle irons 180 are welded to the interior sides of walls 42, adjacent to and over the holes 178 in such a manner as to provide an air conduit or passageway 182, therefor. Air from any suitable source may be introduced from tubes 184, into passageways 182 and through holes 178 to release housing 38 from an adhesive or vacuum induced force created between walls 42 and the corresponding side surfaces 34 of trench 30 by the passage of housing 38 through moist earth or clay. Similarly, holes (not shown) are provided in bottom wall 40 of housing 38, together with angle iron passageways 182 similar to those described above, through which air may be blown to release the housing from a vacuum induced force created between bottom of wall 40 and surface 32 of trench 30. Hence, irons 180, holes 178 and tubes 184 present means for preventing development of suction between walls 40 and 42 of housing 38 and the surfaces 32 and 34 of trench 30. Further, when operating apparatus 20 in a wet, clay-like environment, air from venting holes 178 may be confined by the wet, clay-like material to cause an air cushion to be formed over which housing 38 may travel. Hence, by properly controlling the air pressure in passageways 182, housing 38 may be made to float on air.

Sight gauges 234 are provided on one of the beams 86 (which moves upwardly and downwardly with structure 54), the housing 38, and the mechanism 28. Thus, the exact vertical position of structure 54 may be predetermined. The gauges 234 are all substantially the same and are best illustrated in FIG. 2 where each is shown to comprise a vertically disposed rod 236 having a slidably mounted sleeve portion 238 thereon. A thumb screw 240 is threaded into the portion 238 to bind the portion 238 to the rod 236 when the screw 240 is tightened. A horizontally disposed arm portion 242 extends outwardly from portion 238 and supports a sight rod assembly 244. The assemblies 244 of the several gauges 234 may be aligned with any known reference means, such as a surveying rod on a reference stake, or with each other. Hence, the predetermined elevation of the conduit being laid in trench 30 may be maintained.

In drainage systems, it has been found desirable to provide asphaltic tar papers or the like over and about the upper portion of the conduit to divert silts and fines carried by ground water away from the conduit. Accordingly, a commonly known roll type dispenser 170 is provided in the housing 38 so that asphaltic tar paper generally designated by the numeral 95 may be fed downwardly as guided by idlers 172 and dispensed over the pipeline 22 as it is laid. the tar paper 95 extends beneath hopper 52 and the weight of the filter material discharged from hopper 52 tends to hold the paper 95 in place on the pipeline 22. In practice, it has been found that material being discharged from hopper 52 tends to tear the paper 95 before the same may be conformed about the upper portion of the pipeline 22. Accordingly, an arcuate shield 174 is provided to cause the paper 95 to become conformed to the shape of the pipeline as the paper 95 issues rearwardly from housing 38. As the housing 38 is moved forwardly in the trench 30, the paper 95 is caused to unroll and to be laid over and about the upper portion of the pipeline 22.

Figure 9:
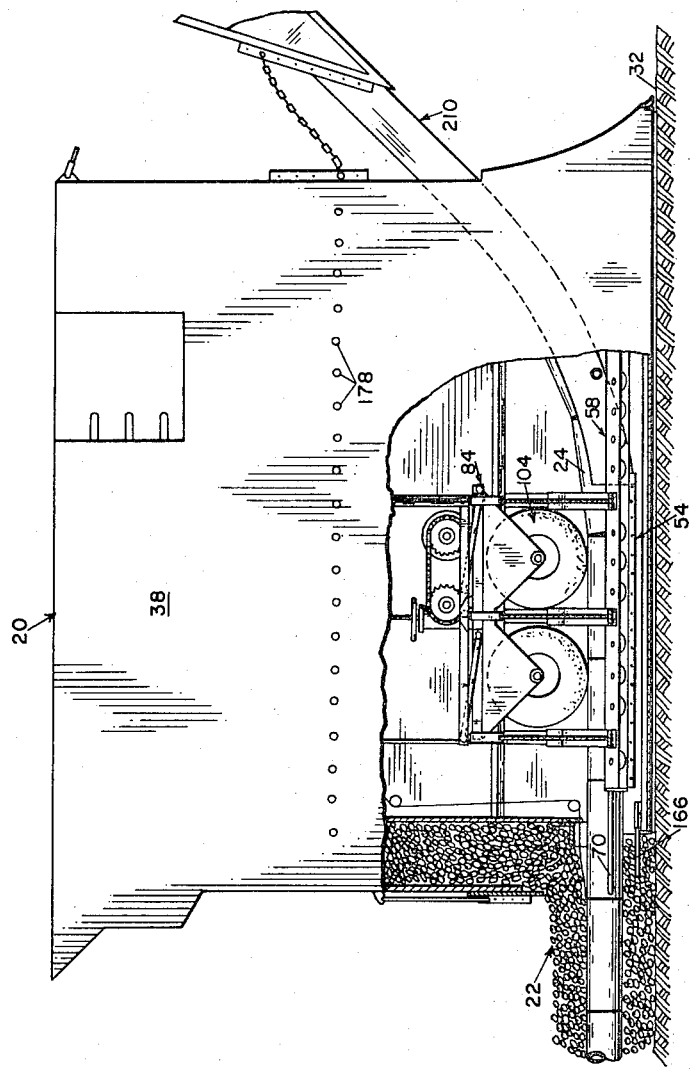
FIG. 9 is a side elevational view illustrating the position of the apparatus in a trench and showing the positions of the pipe sections as the same are handled by the apparatus.

In operation, apparatus 20 is pulled through trench 30 by excavator 26. As apparatus 20 moves through the trench 30, pipe sections 24 are placed on conveyor 210 and fed by gravity until they have reached a position where wheel 104 tangentially and frictionally engages the outer periphery thereof as best illustrated in FIG. 9. Chute 56 of structure 54 guides the section 24 into longitudinal alignment with pipeline 22 as wheel 104 rotates to shift the section 24 into abutment with the forwardmost end of the pipeline. After the new section 24 is firmly abutted against the existing pipeline 22, the corresponding slip clutch 114 will operate to prevent wheel 104 from exerting sufficient force on the section 24 to either damage the individual sections of the pipeline 22 or displace the same laterally. Thus, the longitudinal forces exerted on the section 24 are decreased after the same has been shifted into abutment with the existing pipeline 22.

As the apparatus 20 continues to move forwardly, the section 24 is maintained relatively motionless because although wheel 104 exerts a rearwardly directed force on section 24, movement of the latter is resisted by pipeline 22. Thus, wheel 106 rolls onto the section 24 as wheel 104 rolls onto the next forward section 24 and wheel 106 exerts a rearward force on the section 24 to maintain the entire pipeline in compression. That is to say, the points of application of the forces applied on the sections 24 by wheels 104 and 106 are simultaneously and continuously moved longitudinally of the sections 24 and away from pipeline 22 while the sections 24 are continually urged toward pipeline 22 to maintain the latter in compression throughout the construction thereof.

Viewing FIG. 9 it can be seen that the sections 24 are continually moving rearwardly relative to structure 54. This, of course, is the result of maintaining the sections 24 motionless relative to trench 30 while moving apparatus 20 therealong. Hence, the sections 24 move through exitway 53 and are momentarily supported by guide rods 70. Filter material from hopper 52 is distributed by gravity until it completely surrounds the sections 24 (which are now an integral part of pipeline 22). The vibrator rods 166 facilitate packing of the filter material while edge 158 of gate 142 controls the amount of material deposited atop pipeline 122.

Generally, it is desirable that the grade level of pipeline 22 be maintained very accurately. Since housing 38 is supported by surface 32 of trench 30, the position of housing 38 will be determined by the grade maintained for surface 32. As mentioned above, it is not practical to attempt to maintain the grade of surface with the degree of accuracy desired for pipeline 22. Thus, the vertical position of housing 38 will vary beyond the desirable limits. To remedy this effect, structure 54 is mounted for rectilinear, vertical movement within housing 38. Hence, whenever the depth of trench 32 changes, motorized jack 164 is actuated to correspondingly raise or lower structure 54 and mechanism 84 so that the absolute position of pipeline 32 remains unchanged irrespective of the depth of surface 32.

Having thus described in detail a preferred apparatus which embodies the concepts and principles of the invention and which accomplishes the various objects, purposes and aims thereof, it is to be appreciated and will be apparent to those skilled in the art, that many physical changes could be made in the apparatus without altering the inventive concepts and principles embodied therein. Hence, it is intended that the scope of the invention be limited only to the extent indicated in the appended claims.

I claim:

1. A method of constructing a pipe line consisting of a plurality of elongated pipe sections disposed in end-to-end relationship, said method comprising:
   establishing an initial length of pipe line,
   emplacing a first pipe section in longitudinal alignment with said initial length,
   shifting said first section toward said initial length by applying one longitudinally acting force to the periphery thereof,
   emplacing at least a subsequent pipe section in longitudinal alignment with said first section and said initial length,
   applying another force to the outer periphery of said subsequent section to shift the latter to said first section, while continuing to apply said one force to said first section, and
   continuously moving the points of application of said forces longitudinally of said first and subsequent sections and away from the pipe line while continually urging the sections toward the pipe line with a substantially constant force.

2. A method as set forth in claim 1 wherein is included the step of decreasing the intensity of said forces whenever the movement of the section to which the force is applied is resisted by the pipeline.

3. A method for installing either of jointed or continuous conduit or the like in an elongated earthen trench comprising the steps of:
   moving a mobile housing along and within said earthen trench,
   conveying downward and into said housing substantially a continuous supply of said conduit,
   supporting said conveyed conduit within said housing in substantial longitudinal alignment laterally and vertically, with said trench,
   distributing and consolidating backfill material under, around and above said conduit,
   imparting a substantially constant longitudinal force on said conduit, said force being directed rearwardly relative to the direction of travel of said housing and
   moving continuously the point of application of said force longitudinally of said conduit in the direction of travel of said housing, while continuously exerting said force.

4. The method defined in claim 3 comprising the additional step of:
   introducing air pressure between a wall of said housing and a surface of said trench adjacent to said wall for precluding the development of suction therebetween.

* * * * *